(No Model.)

J. W. VOGEL.
Glass Furnace.

No. 231,123. Patented Aug. 10, 1880.

Witnesses:
Fred G. Dieterich
J. Walter Fowler

Inventor:
John W. Vogel
by Louis Bagger & Co.
Attorneys

UNITED STATES PATENT OFFICE.

JOHN W. VOGEL, OF SHARPSBURG, PENNSYLVANIA.

GLASS-FURNACE.

SPECIFICATION forming part of Letters Patent No. 231,123, dated August 10, 1880.

Application filed May 8, 1880. (No model.)

*To all whom it may concern:*

Be it known that I, JOHN W. VOGEL, of Sharpsburg, in the county of Allegheny and State of Pennsylvania, have invented certain new and useful Improvements in Glass-Furnaces; and I do hereby declare that the following is a full, clear, and exact description of the invention, which will enable others skilled in the art to which it appertains to make and use the same, reference being had to the accompanying drawings, which form a part of this specification, and in which—

Figure 1:
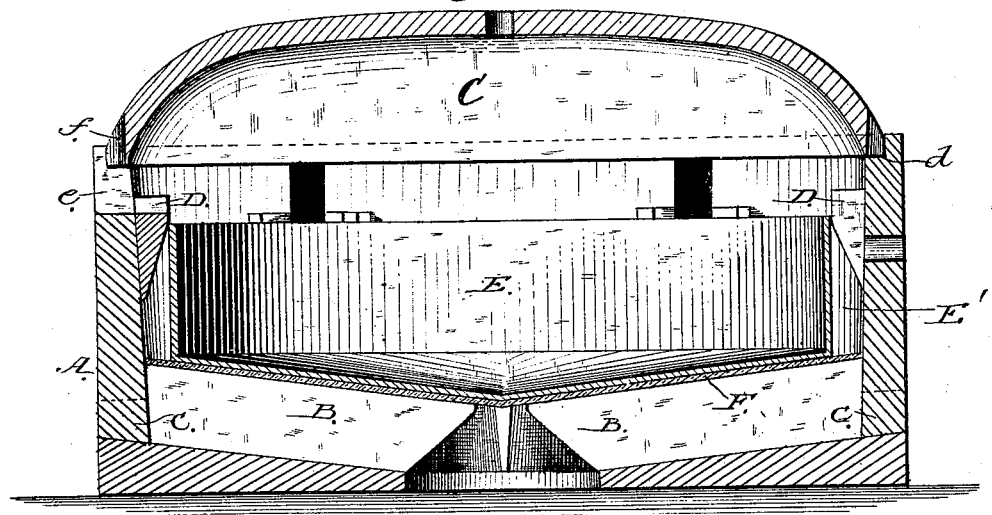
Figure 2:
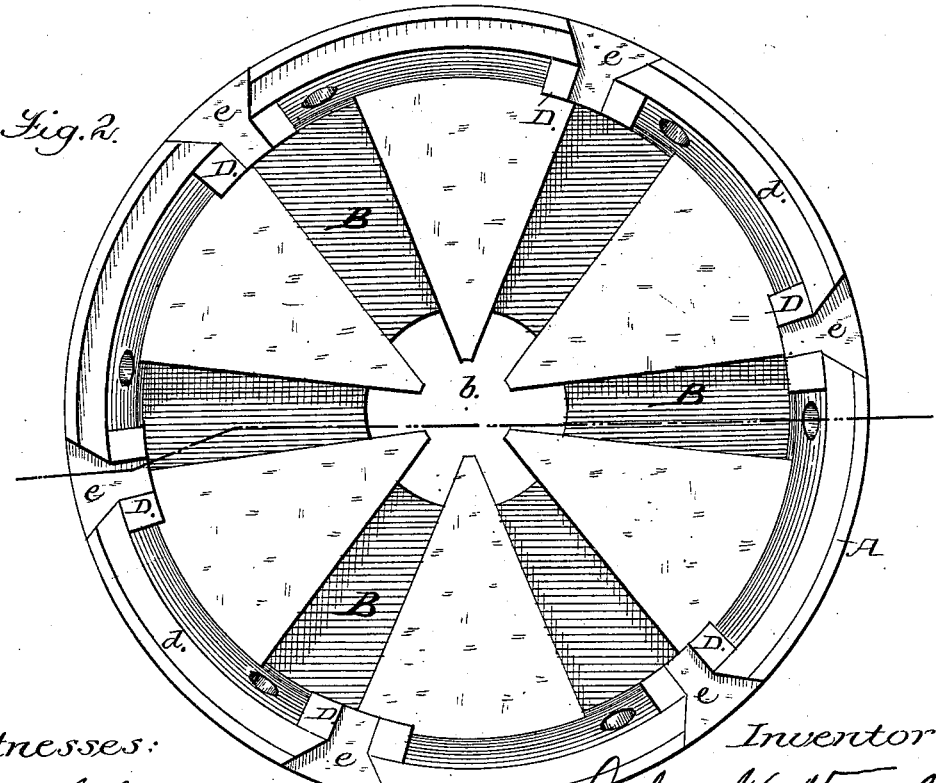

Figure 1 is a vertical section of my improved glass-furnace and tank, and Fig. 2 is a plan view of the same with the top or dome removed.

This invention contemplates improvements in glass-furnaces and tanks, its object being to expose the tank or pot to the greatest possible amount of heat; and it consists of a furnace, preferably cylindrical in shape, with a series of radial underneath flues, leading from a central bottom eye, and communicating with an annular space around the tank opening into a chamber above the tank, the said flues having either inclined, semicircular, or perpendicular walls, substantially as hereinafter more fully set forth.

In the accompanying drawings, A indicates the furnace, preferably cylindrical in shape, with its bottom inclined to a central point thereof, while below the surface of its bottom are radial flues B, with either inclined or semicircular walls, (or they may be perpendicular,) open their entire length. These flues or open arches radiate from a central eye, $b$, passing through the bottom of the furnace, and terminate at their divergent ends at the base of the inside of the wall $c$ of the furnace. These flues or open arches also diverge in width toward their outer ends, to permit of the more free egress of the upward-ascending currents of hot air from the flues against and around the tank.

C is the upper removable part or dome, with its lower edge or surface resting upon and inside of a flange, $d$, of the furnace A, while the upper edge of the furnace is provided with an equal number of coincident holes or eyes, $e\ e$, with the flues therein, directly over which eyes the edge of the dome C is concaved vertically, as at $f$.

D D are offsets fastened or formed with the walls of the furnace, with their upper surfaces standing flush with the bottom of the eyes $e\ e$, while their under sides are beveled off to avoid as much as possible the intercepting of the upward-ascending currents of hot air.

E is the tank or pot for holding the materials for melting, of a cylindrical form, with its bottom more or less tapering to conform to and permit it to rest properly upon the bottom of the furnace over the flues, and with its sides abutting against the offsets D D, thus leaving an annular space, E′, between the tank and the sides or wall of the furnace for the upward passage of the hot air, to allow it to pass over or above the contents of the tank and fill the chamber of the dome.

If desired, a slab of stone, clay, or brick, or other suitable material, F, may be placed upon the bottom of the furnace, of such diameter or size as to partially cover the flues, for the tank or pot to rest on.

Series of draft-holes may be or are made through the sides or walls of the furnace.

This construction, it will be observed, exposes the bottom and sides of the tank and its contents to the immediate contact of the heat or action of the fire issuing up through central flue-eye from the fire-pot placed under the furnace.

Having thus fully described my invention, I claim and desire to secure by Letters Patent of the United States—

The pot or tank placed over and in combination with the central eye, and the radial open arches or flues radiating from the center toward the outer edges of said pot or tank, and the partial covering of the arches, consisting of a slab of suitable material, as set forth.

In testimony that I claim the foregoing as my own I have hereto affixed my signature in presence of two witnesses.

JOHN W. VOGEL.

Witnesses:
 JNO. EASTLAND,
 MIKE SCHEPPNER.